US011773951B1

(12) United States Patent
Timmons

(10) Patent No.: US 11,773,951 B1
(45) Date of Patent: Oct. 3, 2023

(54) CONTINUOUSLY-VARIABLE TRANSMISSION WITH OSCILLATING RACKS

(71) Applicant: Aptiv Technologies Limited, St. Michael (BB)

(72) Inventor: Adam Troy Timmons, Royal Oak, MI (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 18/045,073

(22) Filed: Oct. 7, 2022

(51) Int. Cl.
*F16H 37/12* (2006.01)
*F16H 29/12* (2006.01)

(52) U.S. Cl.
CPC .............. *F16H 37/12* (2013.01); *F16H 29/12* (2013.01)

(58) Field of Classification Search
CPC ........ F16H 37/12; F16H 29/12; F16H 37/122; F16H 37/124; F16H 37/14; F16H 29/20; F16H 15/04; F16H 15/20
See application file for complete search history.

(56) References Cited

U.S. PATENT DOCUMENTS

| 4,565,105 | A | * | 1/1986 | Peterson | ................. F16H 29/20 74/834 |
| 5,603,240 | A | * | 2/1997 | Klovstad | ................. F16H 29/20 74/120 |
| 2009/0229391 | A1 | * | 9/2009 | Eakin | ..................... F16H 37/12 74/117 |

FOREIGN PATENT DOCUMENTS

JP 2017053455 A * 3/2017 ........... F16H 37/122

* cited by examiner

*Primary Examiner* — Stacey A Fluhart
*Assistant Examiner* — Aimee Tran Nguyen
(74) *Attorney, Agent, or Firm* — Sawtooth Patent Group PLLC

(57) ABSTRACT

Described herein is a continuously variable transmission (CVT) with oscillating racks. The CVT includes an input shaft and a plurality of cams that are coupled with the input shaft. The cams are configured to rotate with a rotation of the input shaft. The CVT also includes a plurality of racks that are coupled to respective cams. The racks are configured to oscillate with the rotation of the input shaft. The CVT further includes a plurality of pinions that are coupled to respective racks and a plurality of intermittent shafts that are coupled with respective pinions. The CVT also includes an output shaft that is coupled with the intermittent shafts. The output shaft is configured to rotate with a uniform rotation and a speed ratio relative to the rotation of the input shaft. Because the CVT does not use friction elements, many downsides of conventional CVTs may be mitigated.

20 Claims, 9 Drawing Sheets

CONTINUOUSLY-VARIABLE TRANSMISSION WITH OSCILLATING RACKS

BACKGROUND

Automotive transmissions are used to create various speed ratios between engines and drive shafts of automobiles. Most transmissions use a fixed number of gears (e.g., 2-18), which enable a plurality of discrete speed ratios. Continuously variable transmissions (CVTs), on the other hand, can produce a nearly infinite number of speed ratios between a minimum and maximum value. CVTs often enable increased fuel economy and lower emissions than geared transmissions.

SUMMARY

This document is directed to a CVT with oscillating racks and methods related thereto. Some aspects described below include the CVT with oscillating racks that includes an input shaft and a plurality of cams that are coupled with the input shaft. The cams are configured to rotate with a rotation of the input shaft. The CVT with oscillating racks also includes a plurality of racks that are coupled to respective cams. The racks are configured to oscillate with the rotation of the input shaft. The CVT with oscillating racks further includes a plurality of pinions that are coupled to respective racks and a plurality of intermittent shafts that are coupled with respective pinions. The CVT with oscillating racks also includes an output shaft that is coupled with the intermittent shafts. The output shaft is configured to rotate with a uniform rotation and a speed ratio relative to the rotation of the input shaft.

This Summary introduces simplified concepts of a CVT with oscillating racks that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

A CVT with oscillating racks is described with reference to the following drawings that use some of the same numbers throughout to reference like or examples of like features and components.

DETAILED DESCRIPTION

Overview

Figure 1:
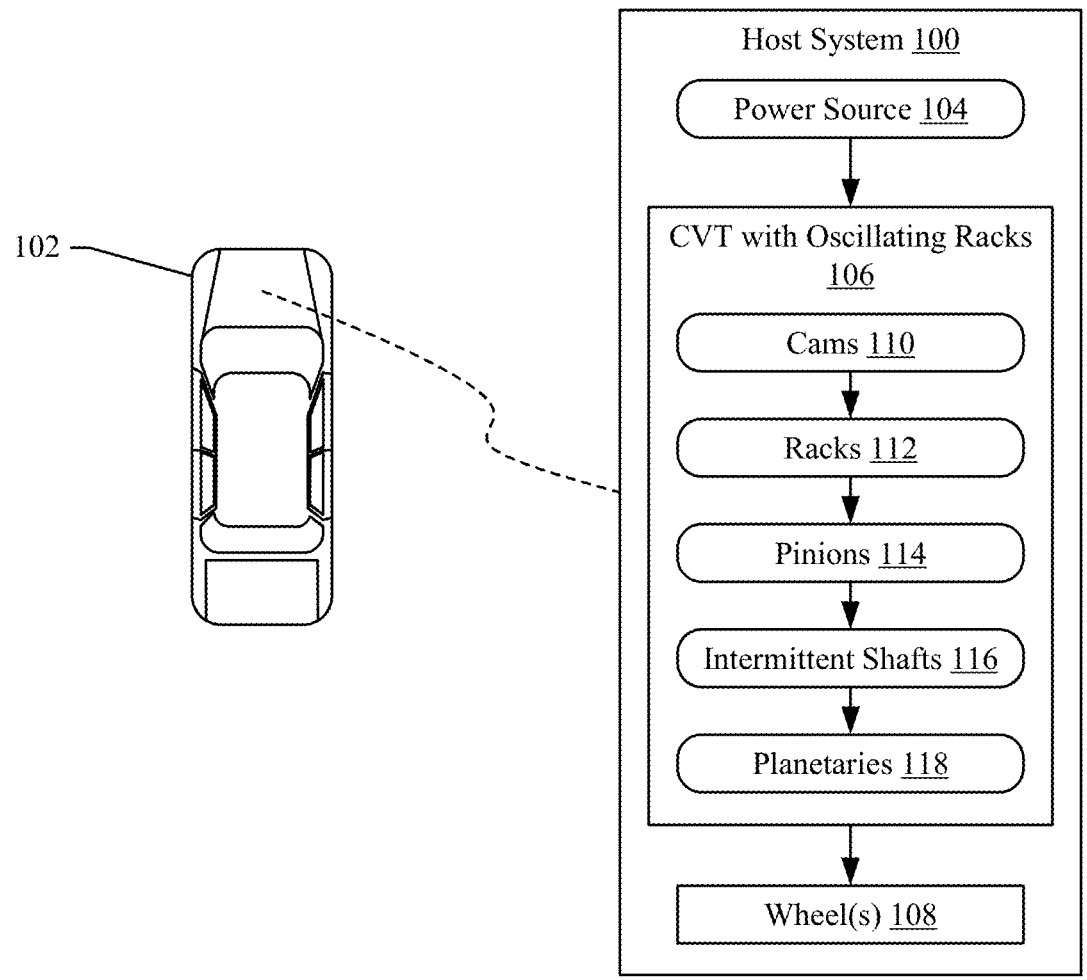
FIG. 1 illustrates, in accordance with this disclosure, an example vehicle system containing a CVT with oscillating racks.

CVTs are able to produce a nearly infinite number of speed ratios between a minimum and maximum value, which allows associated automobiles to have increased fuel economy and lower emissions compared to geared transmissions. Conventional automotive CVTs rely on one or more friction elements (e.g., belts) to transfer power from one place to another (e.g., between two variable-diameter pulleys). High power-holding requirements and low maintenance requirements often cause the friction elements and thus, the CVTs, to be expensive. Furthermore, the friction elements are unable to achieve fast ratio changes compared with fixed gear ratio automotive transmissions because they need to maintain a certain amount of friction contact. If a gear ratio change is forced too quickly, it can cause friction between parts that rely on friction for proper functionality to be partially lost. Additionally, an increase in heat and wear of such parts (e.g., caused by slippage) can result in catastrophic failure of the friction elements and thus, the CVTs. The friction may also cause energy loss, as the motion of the parts in frictional contact must have work applied to overcome friction-induced resistance to motion.

Described herein is a CVT with oscillating racks. The CVT with oscillating racks includes an input shaft and a plurality of cams that are coupled with the input shaft. The cams are configured to rotate with a rotation of the input shaft. The CVT with oscillating racks also includes a plurality of racks that are coupled to respective cams. The racks are configured to oscillate with the rotation of the input shaft. The CVT with oscillating racks further includes a plurality of pinions that are coupled to respective racks and a plurality of intermittent shafts that are coupled with respective pinions. The CVT with oscillating racks also includes an output shaft that is coupled with the intermittent shafts. The output shaft is configured to rotate with a uniform rotation and a speed ratio relative to the rotation of the input shaft. Because the CVT with oscillating racks does not use friction elements, it is an improvement upon conventional CVTs.

Uniform circular rotation of the output shaft manifests from uniform circular rotation of the input shaft without residual oscillatory disturbance. This is achieved by a cam lobe profile that results in a rack assembly producing a rotational speed profile of $A \sin^2(\omega t)$ coupled through a planetary gear with the result of another rack assembly producing a rotational speed profile of $A \cos^2(\omega t)$. The overall rotational speed profile is $A \sin^2(\omega t) + A \cos^2(\omega t) = A$ in accordance with the trigonometric identity $\sin^2(\theta) + \cos^2(\theta) = 1$, where A is the gear ratio between the input and output shafts.

The CVT with oscillating racks is a continuously-variable transmission because the value of A is continuously variable. This is achieved by a continuously variable cam lobe profile that varies between an extremum of no cam lobe displacement, meaning the surface of the cam shaft undistorted by the presence of a lobe on the shaft (e.g., equivalent point of Neutral (A=0) because for a finite input shaft rotational speed there is no energy and thus no speed transmitted to the output shaft), and an extremum of a maximum cam lobe displacement from the surface of the cam shaft (e.g., equivalent point of top gear (A=Amax)).

Example Vehicle System

FIG. 1 illustrates an example of a host system 100 containing a CVT with oscillating racks. The host system 100 may be disposed in or configured to be disposed in a host 102. The host 102 may be any type of vehicular and/or industrial system (e.g., automobile, car, truck, motorcycle, e-bike, boat, air vehicle, and so on). A host industrial system may be any type of machinery system (e.g., the machinery of a conveyor assembly).

The host system 100 contains a power source 104, a CVT with oscillating racks 106, and one or more wheels 108. The power source 104 may be any power generating unit (e.g., electric motor, engine, turbine) that is configured to cause the wheels 108 to rotate. The power source 104 generally produces rotational power, however, linear power may be converted to rotational power as an input for use by the CVT with oscillating racks 106. Rotational energy from the power source 104 enters the CVT with oscillating racks 106 via an input shaft, has a speed ratio applied via the CVT with oscillating racks 106, and is transmitted (e.g., to wheels of the host 102) via an output shaft of the CVT with oscillating racks 106. Conventional means of achieving neutral, park, and reverse may be part of the CVT with oscillating racks 106.

Within the CVT with oscillating racks 106 are cams 110, racks 112, pinions 114, intermittent shafts 116, and planetaries 118. The cams 110 are coupled with the input shaft and configured to rotate with the input shaft (e.g., via any number of camshafts). The cams 110 may be single-lobe cams with a duration of 360 degrees (180 degrees lifting and 180 degrees returning), double-lobe cams with durations of 180 degrees (90 degrees lifting and 90 degrees returning), quad-lobe cams with lift durations of 90 degrees (45 degrees lifting and 45 degrees returning), and so on. The cams 110 may have a three-dimensional profile that tapers down to round (from a maximum amplitude or height of the lobe(s)) along a length of the camshafts to achieve the variable speed ratio. The taper of the cams 110 is described further below.

The cams 110 are coupled with respective racks 112, such that the cams 110 cause the racks 112 to oscillate in a direction of the gear (e.g., along the rack) as they follow the cams 110. For example, the cams 110 may be coupled to ends of the racks (either directly or via one or more intermediate parts). A linear position of the cams 110 relative to the racks 112 (e.g., a location on the taper) causes a varying amplitude of oscillation of the racks.

The cams 110 may be offset from each other (e.g., be out of phase) such that the racks 112 oscillate in a sequential fashion. If single-lobe cams are used, the offset may be 90 degrees. If double-lobe cams are used, the offset may be 45 degrees. If quad-lobe cams are used, the offset may be 22.5 degrees. Other numbers of lobe cams may be used similarly (e.g., with respective offsets).

Coupled with the racks 112 are respective pinions 114. The pinions 114 are gears that are coupled to the racks that oscillate in rotation about respective axes (e.g., centroids of associated shafts) due to the oscillation of the racks 112. The pinions 114 are connected to respective intermittent shafts 116 (e.g., axes of rotation) via one-way clutches between the pinions 114 and the intermittent shafts 116. The one-way clutches are configured such that the intermittent shafts 116 rotate only in one direction (e.g., when the racks 112 are traveling in a certain direction). For example, the one-way clutches may be configured such that the intermittent shafts 116 only rotate when the racks 112 are being pushed by the cams 110.

The intermittent shafts 116 are also coupled to a housing of the CVT with oscillating racks 106 via one-way clutches. The one-way clutches between the intermittent shafts 116 and the housing are configured to ensure that other rotations of other intermittent shafts 116 are not transmitted back to the respective intermittent shaft 116. The respective intermittent shaft 116 may otherwise be free to rotate responsive to its associated rack 112 falling (e.g., not being pushed by its respective cam 110). The one-way clutches between the intermittent shafts 116 and the housing also ensure that vehicle movement (e.g., rolling, coasting) does not transmit back through the intermittent shafts 116.

The intermittent shafts 116 are coupled to the planetaries 118. The planetaries 118 are planetary gears with two inputs being added to produce an output. The inputs may be to two of a group of a ring gear, a sun gear, or a planet carrier, and the output may be a third of the group. Although not shown, one or more of the intermittent shafts 116 may be coupled to the planetaries via conventional gears to achieve a speed adjustment (e.g., such that the inputs to the planetaries 118 have corresponding speeds).

Two of the intermittent shafts 116 may be coupled to a first planetary 118 that produces a first planetary rotation (an addition of the rotations of the two intermittent shafts 116). Two others of the intermittent shafts 116 may be coupled to a second planetary 118 that produces a second planetary rotation (an addition of the rotations of the other two intermittent shafts 116).

Two of the intermittent shafts 116 produce a rotational speed profile of $A \sin^2(\omega t)$ for half a rotation (one being offset by half a rotation from the other). Their sum through one of the planetaries 118 produces a rotational speed profile of $A \sin^2(\omega t)$ for all of the rotation. Another two of the intermittent shafts 116 produce a rotational speed profile of $A \cos^2(\omega t)$ for half a rotation (one being offset by half a rotation from the other). Their sum through another one of the planetaries 118 produces a rotational speed profile of $A \cos^2(\omega t)$ for all of the rotation.

The first and second planetary rotations (e.g., on respective planetary shafts) may be combined via a third planetary 118 to produce an output rotation on the output shaft that corresponds to $A \sin^2(\omega t) + A \cos^2(\omega t)$. Thus, an input speed profile that is not a function of time results in an output speed profile that is likewise not a function of time. Accordingly, the oscillatory motion may have no resultant effect on the final output.

It should be noted that the planetaries 118 may be coupled to the planetaries 118 in many configurations. Due to the commutative properties of addition, any two of the intermittent shafts 116 may be added by the first planetary 118 and the remaining two of the intermittent shafts 116 may be added by the second planetary 118. Regardless of how they are configured, the output of the three planetaries 118 produces a $A \sin^2(\omega t) + A \cos^2(\omega t)$ speed profile.

The CVT with oscillating racks is configured such that the rotations of the intermittent shafts 116 follow $\sin^2$ speed profiles from zero to $\pi$ radians and zero speed profiles from $\pi$ to $2\pi$ radians of the input shaft, with each of the intermittent shafts being $\pi/2$ offset. In this way, two of the cams 110 are always pushing the host system 100 forward (at certain instantaneous angles, one cam 110 may be contributing zero force but about to start pushing the host system 100). The speed profiles of the intermittent shafts 116, when overlapped (e.g., via the planetaries 118) follow $\sin^2$ and cos² curves that sum to 1 (per the trigonometric identity) corresponding to uniform circular motion (e.g., no remaining speed profile oscillation). As mentioned above, the variable profile of the cams 110 along the lengths of the camshafts allows for variable lift (e.g., A), and therefore speed of the intermittent shafts 116, and thus the output shaft (because $A \sin^2(\omega t) + A \cos^2(\omega t) = A$).

Figure 2:
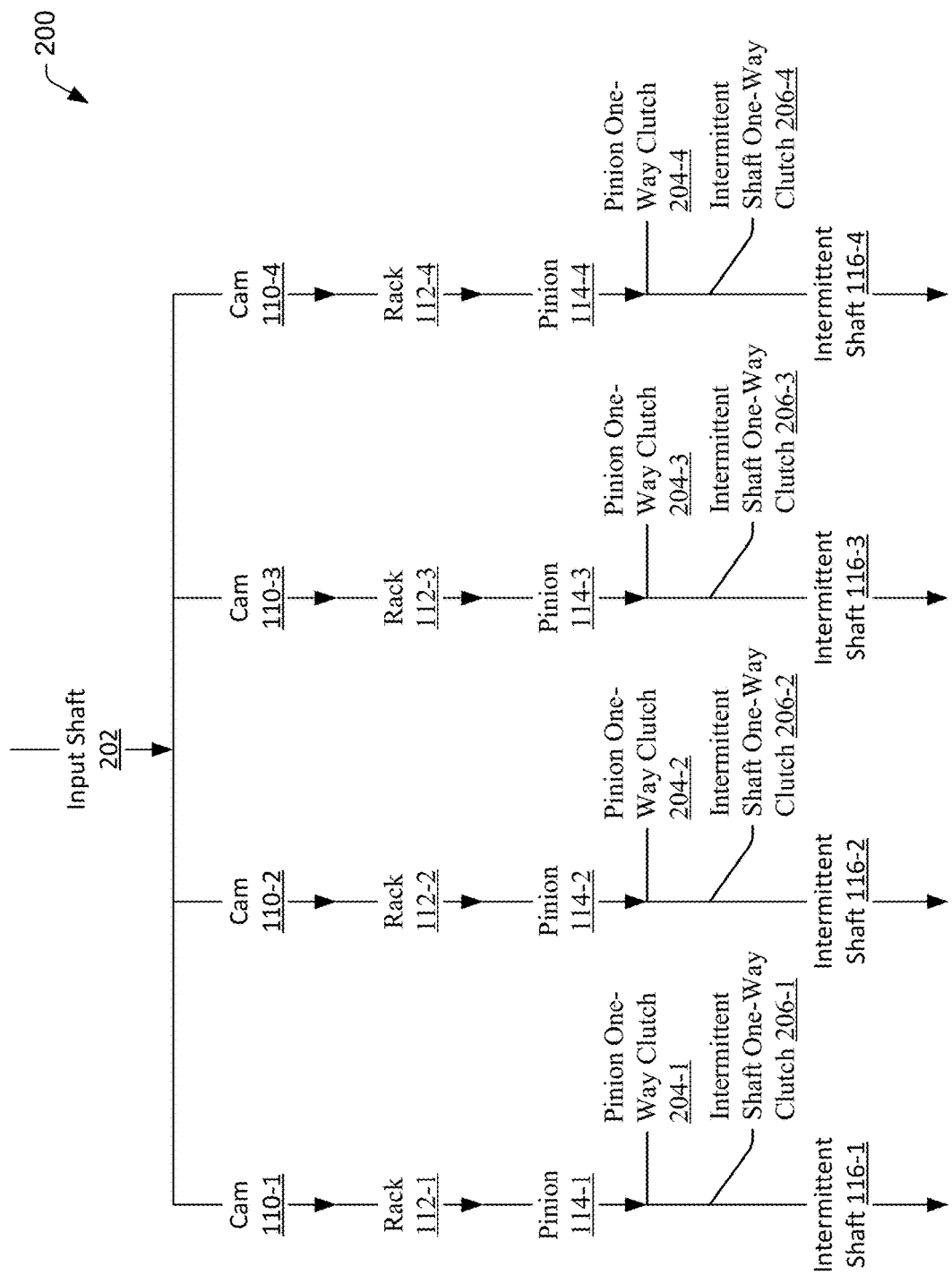
FIG. 2 illustrates, in accordance with this disclosure, an example rotational flow through components of the CVT with oscillating racks.

Power Flow from an Input Shaft Through the Cams, Racks, Pinions, and Intermittent Shafts FIG. 2 illustrates an example of a rotational flow 200 through the CVT with oscillating racks 106. This example is not the only possible implementation and is meant to be illustrative rather than restrictive. The rotational flow 200 is implemented within the CVT with oscillating racks 106. The rotational flow 200 starts with a rotation of an input shaft 202 (e.g., based on an output from the power source 104). The rotation of the input shaft 202 is split into rotations of four cams 110 (e.g., cams 110-1 through 110-4). The cams 110 may be on a single camshaft, on individual camshafts, or on multiple camshafts (e.g., one camshaft for cams 110-1 and 110-2 and another camshaft for cams 110-3 and 110-4). As discussed above, the cams 110 are offset from each other. Continuing with the example of single-lobe cams, the cams 110 may be sequentially offset by 90 degrees (e.g., cam 110-2 is 90 degrees offset from cam 110-1, cam 110-3 is 180 degrees offset from cam 110-1, and cam 110-4 is 270 degrees offset from cam 110-1).

The cams 110 interface with respective racks 112. The cams 110 may interface with ends of the racks 112 such that the racks 112 oscillate with the rotation of the cams 110. Each cam 110 has a respective rack 112 such that the racks 112 oscillate sequentially (e.g., they are all at different points in the speed profile) with the sequential rotation of the cams 110.

The racks 112 have respective pinions 114 which turn respective intermittent shafts 116 via respective pinion one-way clutches 204. The pinion one-way clutches 204 are configured to only rotate the intermittent shafts 116 when the rack is traveling in a certain direction (e.g., when they are being pushed by the cams 110).

It should be noted that the rack 112/pinion 114 groups may be replaced with pulleys and cables without departing from the scope of this disclosure. Furthermore, the racks 112 may be replaced by a round gear on a rotating pivot without departing from the scope of this disclosure.

Between the intermittent shafts 116 and a housing of the CVT with oscillating racks 106 are intermittent shaft one-way clutches 206. The intermittent shaft one-way clutches 206 are configured to only allow the intermittent shafts 116 to rotate in one direction. By doing so, the rotations of the intermittent shafts 116 are not affected by rotations of other intermittent shafts 116, nor a rolling of the host system 100.

Example Cams

Figure 3:
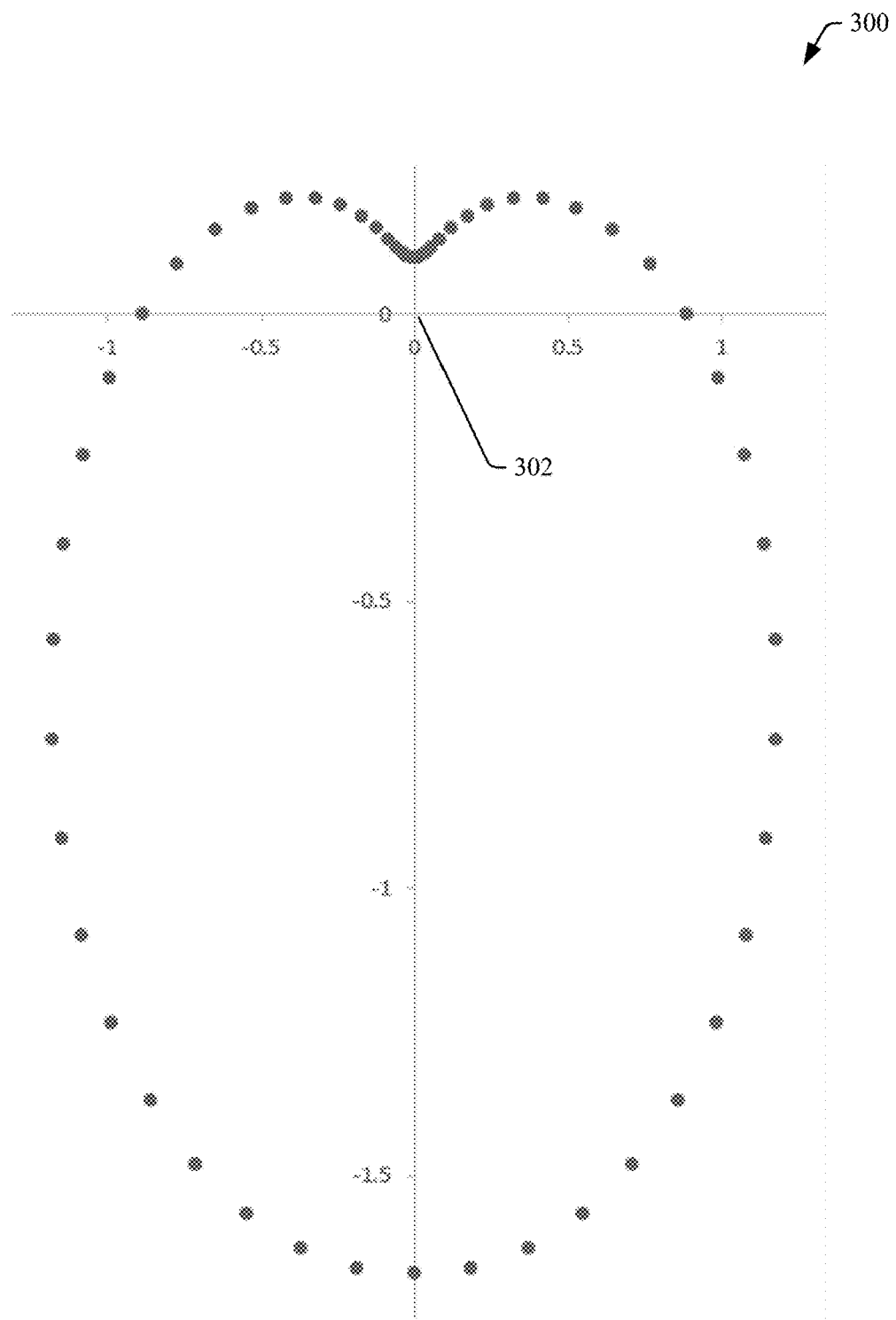
FIG. 3 illustrates, in accordance with this disclosure, an example single-lobe cam of the CVT with oscillating racks.

FIG. 3 illustrates an example of a single-lobe cam 300 that is an example of one of the cams 110. The single-lobe cam 300 rotates about a center of rotation 302 that is at a center of a respective camshaft for the single-lobe cam 300. The profile may be based on an integral of the desired $\sin^2$ speed profile that provides displacement or distance from the center of rotation 302. Accordingly, the distance (e.g., polar distance from the center of rotation 302) may be represented by $x/2-(\sin(x))/4+c$, where x is a polar angle (e.g., radians) and c is a constant that defines the minimum distance from the center of rotation.

The single-lobe cam 300 has a single-lobe profile such that the cams 110 (and thus, the racks 112) are lifting/being pushed for 180 degrees of rotation and returning for 180 degrees of rotation. In this implementation, the cams 110 may be 90 degrees offset such that each cam 110 is at a different quadrant of the single-lobe cam 300 at any given time. Although shown as being symmetric, the single-lobe cam 300 may be asymmetric because only the lifting produces forward motion of the host system 100 whilst the returning of the rack does not contribute to motion of the vehicle system. Thus, the returning profile may be any shape. Doing so allows for a smooth transition onto the lifting profile from the returning profile. The single-lobe cam 300 may taper down to round along a length of the associated camshaft (e.g., into the page).

The lifting lobe shape of the single-lobe cam 300 is representative. The desired speed profile of the racks 112 is $\sin^2$ (or $\cos^2$ or some combination thereof). Thus, the lobe shape may be adjusted to achieve the desired speed profile of the racks 112. Adapting cam profiles into shapes that suit applications (e.g., desired lift, duration, and/or speed profiles) is well-known from their use in lifting valves within internal combustion engines.

Figure 4:
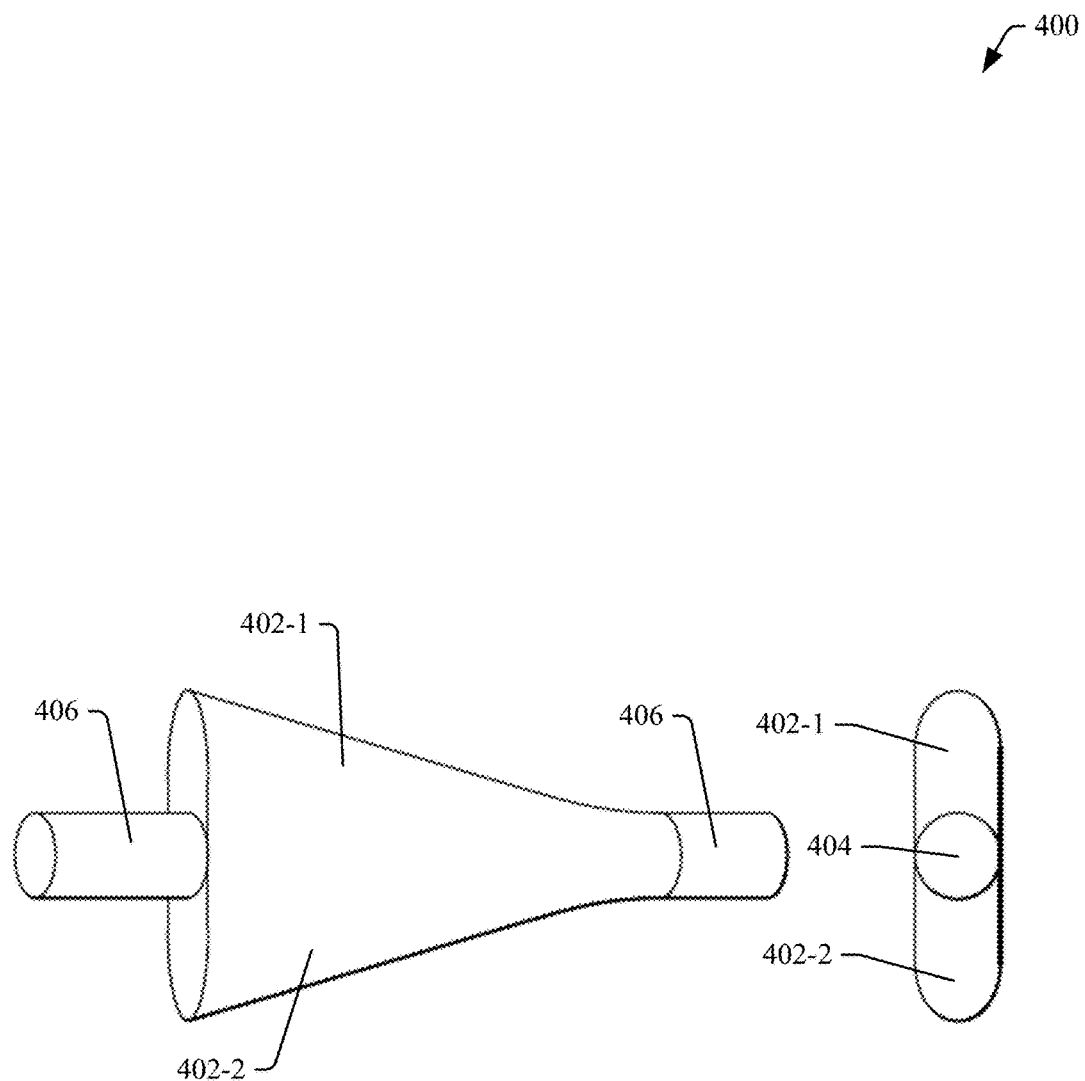
FIG. 4 illustrates, in accordance with this disclosure, an example double-lobe cam of the CVT with oscillating racks

FIG. 4 illustrates an example of a double-lobe cam 400 that is an example of one of the cams 110. The double-lobe cam 400 has a double-lobe profile (e.g., lobes 402-1 and 402-2) such that the cam 110 (and thus, the rack 112) are lifting/being lifted for 90 degrees of rotation and returning for 90 degrees of rotation and then repeated for the next 180 degrees of rotation. In this implementation, the cams 110 may be 45 degrees offset such that each cam 110 is at a different ⅛th of the double-lobe cam 400 at any given time. Although shown as being symmetric, the double-lobe cam 400 may be asymmetric because only the lifting produces forward motion of the host system 100. The center of rotation 404 is a center of a respective camshaft 406 for the double-lobe cam 400. Similar to the single-lobe cam 300, the double-lobe cam 400 may taper down to round along a length of the camshaft 406 (e.g., into the page).

Interface Between the Cams, Racks, Pinions, and Intermittent Shafts

Figure 5:
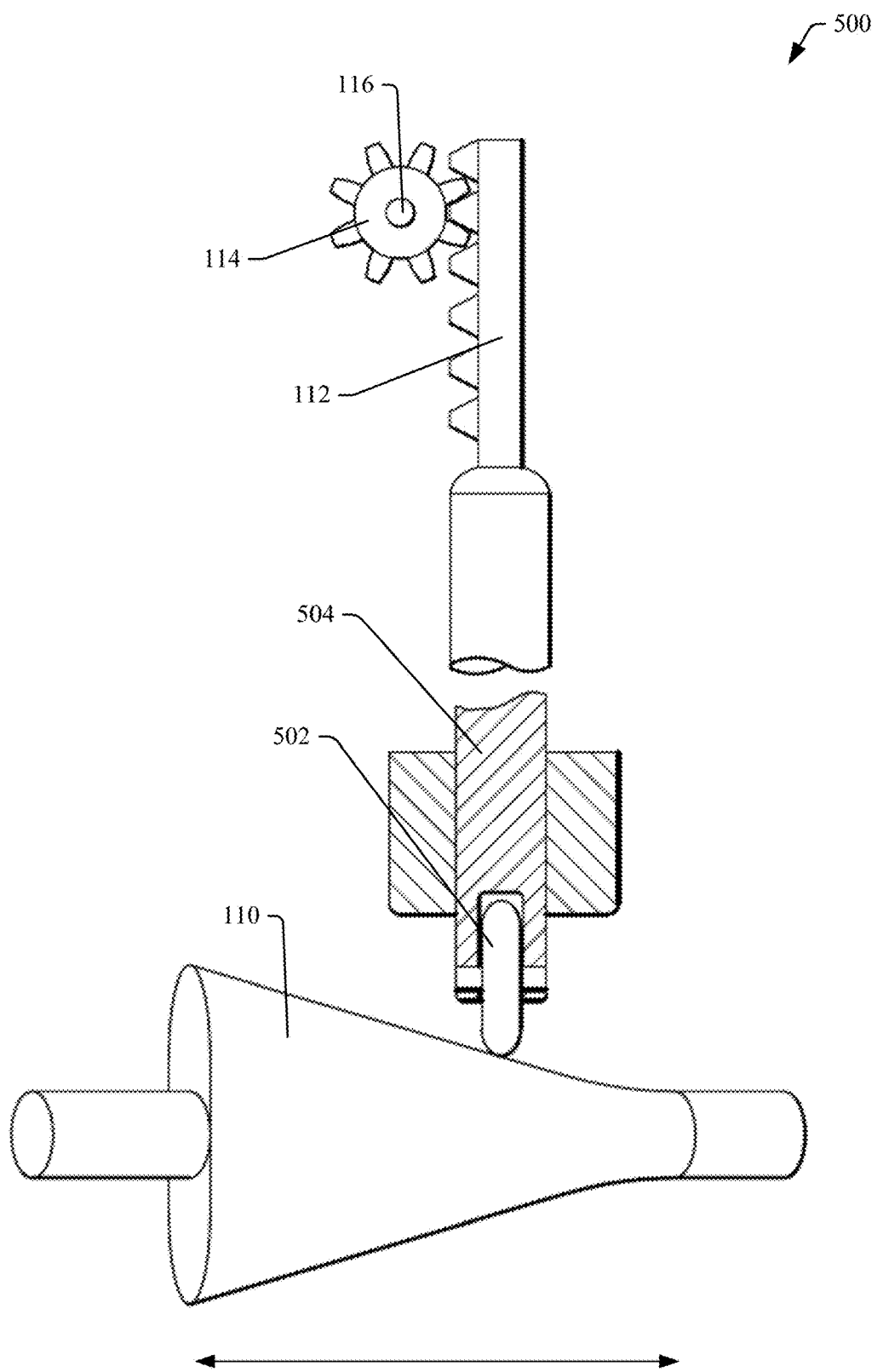
FIG. 5 illustrates, in accordance with this disclosure, an example cam-rack-pinion interface and pinion of the CVT with oscillating racks.

FIG. 5 illustrates, at 500, an example interface between a cam 110, a rack 112, a pinion 114, and an intermittent shaft 116. Although the cam 110 is shown as the double-lobe cam 400, the cam 110 may be the single-lobe cam 300 or a quad-lobe cam (or any other whole number). Between the rack 112 and the cam 110 is a cam follower 502 (e.g., roller, slide, bearing) that follows the profile of the cam 110. The cam 110 is configured to translate relative to the cam follower. As such, the cam follower 502 is configured to allow for transverse motion of the cam 110 (e.g., left/right). Between the cam follower 502 and the rack 112 is a pushrod 504. The pushrod 504 may be a part of the rack 112 or a separate component. Interfacing with the rack 112 is the pinion 114.

The rotation of the cam 110 causes the cam follower 502, the pushrod 504, and the rack 112 to lift (e.g., up in the illustrated example) with a certain speed profile (e.g., $\sin^2$). The lifting of the rack 112 causes the pinion 114 to rotate (counterclockwise in the illustrated example). The rotation of the pinion 114 causes a rotation of the intermittent shaft 116 via the pinion one-way clutch 204 (not shown).

When the cam 110 is on a returning or falling portion, the rack 112 may be falling (down in the illustrated example), which causes the pinion 114 to rotate in the opposite direction (e.g., clockwise in the illustrated example). Because of the pinion one-way clutch 204, the intermittent shaft 116 does not rotate during the falling portion.

Figure 8:
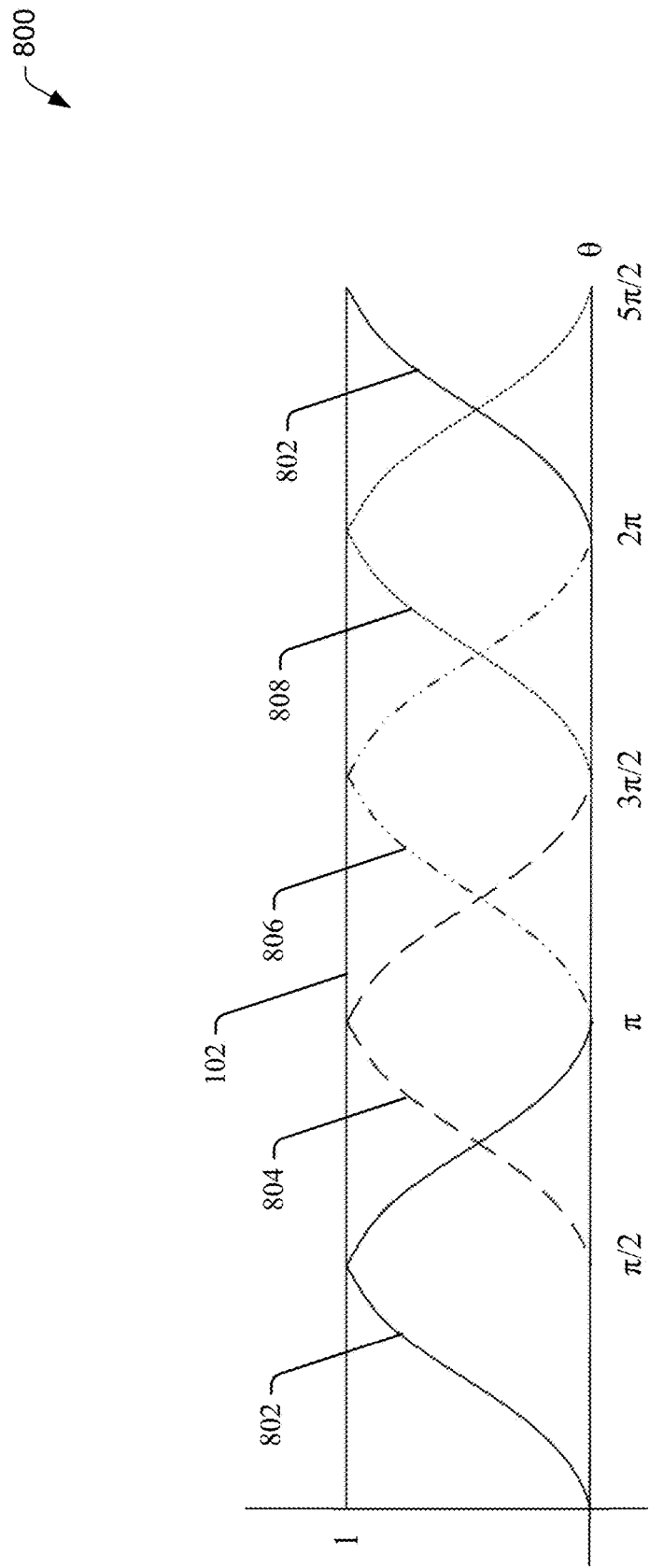
FIG. 8 illustrates, in accordance with this disclosure, an example of the rotational contributions of the intermittent shafts of the CVT with oscillating racks.

Thus, the intermittent shaft 116 rotates for 180 degrees of rotation of the cam 110 (for the single-lobe cam 300) and is at rest for the next 180 degrees of rotation. Because there are four of such assemblies that are 90 degrees offset from each other (for the single-lobe cam 300), there are four speed profiles (e.g., $\sin^2$) offset by 90 degrees (or $\pi/2$ radians) of rotation, with each being active for 180 degrees of rotation. In other words, each of the assemblies are at different portions of the speed curve at any given time. Accordingly, the combined output of the four intermittent shafts produces a $\sin^2$ speed profile overlapped with a $\cos^2$ speed profile ($\sin^2$ with a 90-degree phase shift of rotational speed profile), as shown in FIG. 8.

Interface Between the Racks

Figure 6:
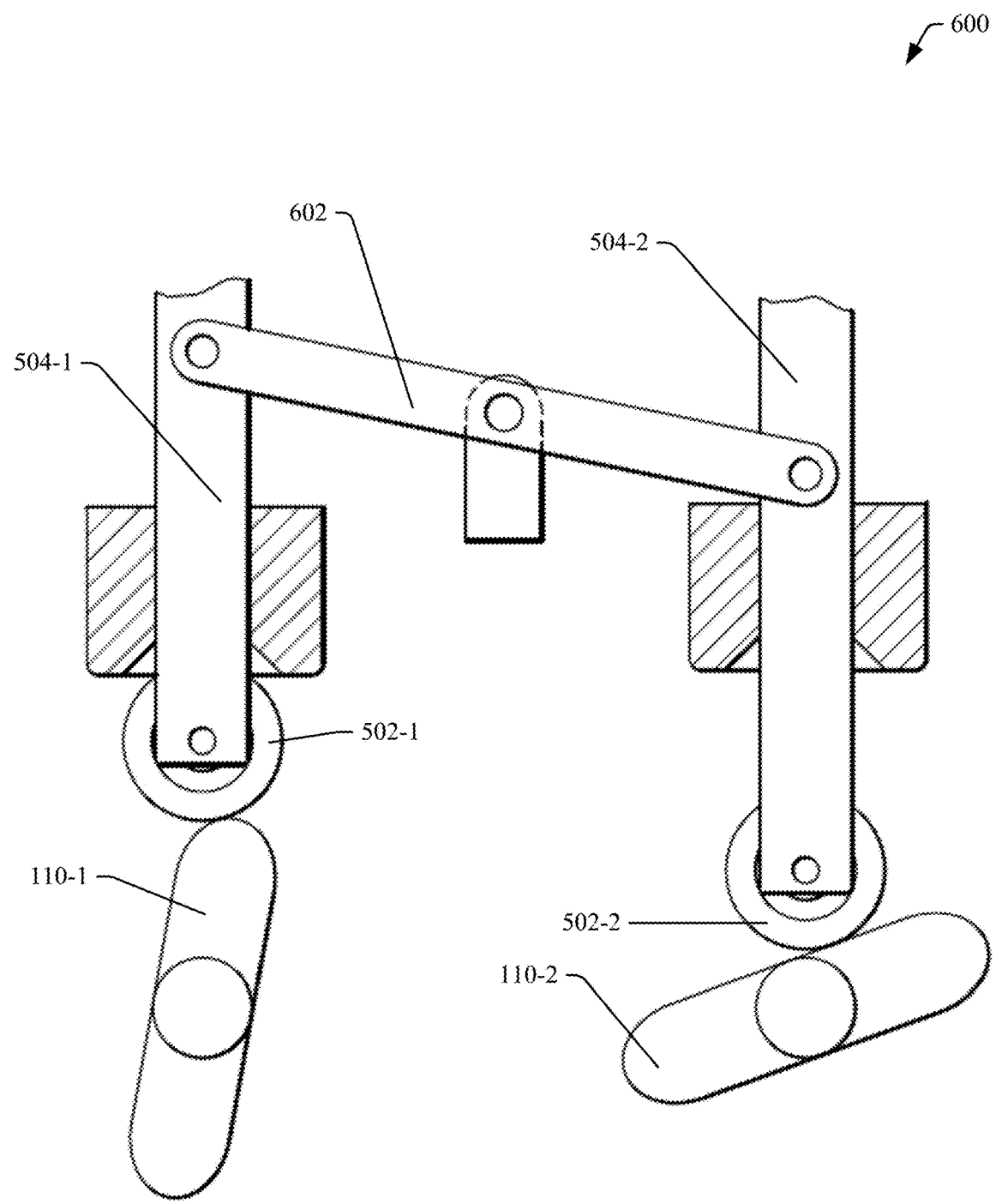
FIG. 6 illustrates, in accordance with this disclosure, an example connection between two racks and two cams of the CVT with oscillating racks.

FIG. 6 illustrates, at 600, an example interface between two cam-rack-pinion-intermittent shaft groups. In order to maintain the cam followers 502 on the cams 110, a connecting rod 602 may be used. The connecting rod 602 may connect groups that are 180 degrees apart. Because one cam 110 is lifting and the other cam 110 is returning. The connecting rod 602 may be connected to the pushrods 504 (as shown) or connected to the cam followers 502, the racks 112, or any other oscillating portion of the groups. The fulcrum of the connecting rod 602 may be able to translate or oscillate (not shown) in order to allow for asymmetric motion of the cam followers 502 (e.g. from asymmetric lobe shapes).

Other means of maintaining contact may be used. For example, there may be springs on opposite ends of the racks 112 that maintain the cam followers 502 on the cams 110. In such implementations, the connecting rod 602 may not be present.

Power Flow Between the Planetaries

Figure 7:
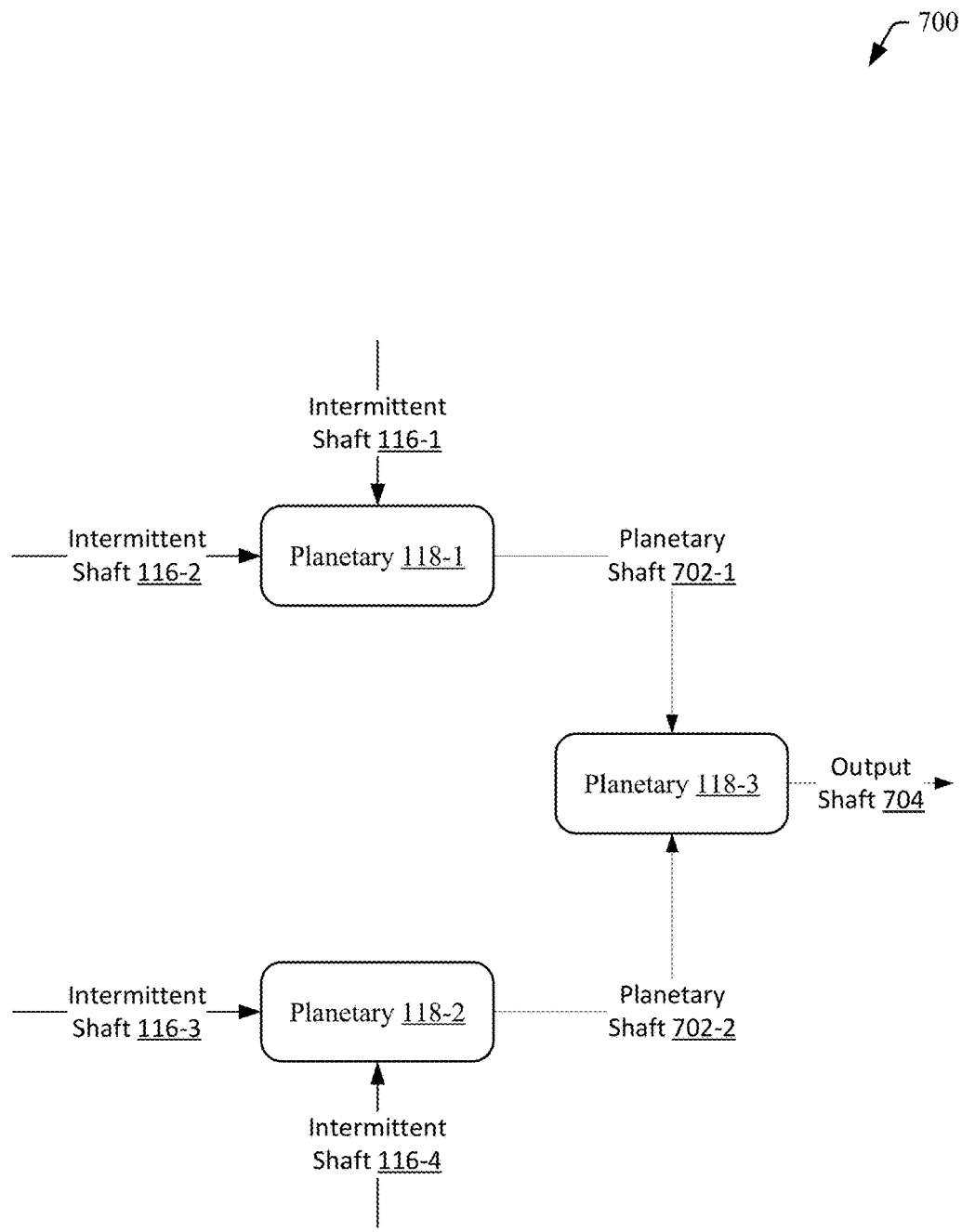
FIG. 7 illustrates, in accordance with this disclosure, an example rotational flow through planetaries of the CVT with oscillating racks.

FIG. 7 illustrates, at 700, an example power flow between the planetaries 118. Each of the planetaries 118 has three inputs/outputs: a ring gear, a sun gear, and a planet carrier. Each of the planetaries 118 are configured as input adders. In other words, they are configured to take two power inputs and produce a power output that is a combination of the two inputs. This is consistent with the well-known planetary gear equation, otherwise known as the Willis equation, $n_r z_r + n_s z_s = n_c(z_r + z_s)$ where n denotes rotational speed, z is a number related to the design of the planetary gear (specifically it's the number of gear teeth), r is the planetary ring gear (annulus), s is the planetary sun gear, and c is the planetary planet carrier. From the Willis equation it is evident that a planetary output is the summation of two planetary inputs.

For example, one of the inputs may be to the ring gear and another to the sun gear, with the planet carrier being the combined output. Since the rotations of the intermittent shafts 116 are to be added, two of the intermittent shafts 116 become the inputs for each of two of the planetaries 118 (e.g., planetary 118-1 and planetary 118-2). The output from planetary 118-1 is a rotation on a planetary shaft 702-1 (e.g., connected to the planet carrier), and the output from planetary 118-2 is a rotation on a planetary shaft 702-2. The planetary shafts 702 then become inputs for the planetary 118-3 which adds the rotations of the planetary shafts 702 and produces a combined rotation on an output shaft 704. The output shaft 704 is configured to be coupled to the wheels 108.

Intermittent Shaft Speed Curves

FIG. 8 illustrates, at 800, an example plot of rotational speed curves of each of the intermittent shafts 116. 802 is a speed curve of a first intermittent shaft 116. The first intermittent shaft 116 follows a $\sin^2$ speed curve from 0 to $\pi$ of camshaft rotation and is at rest from $\pi$ to $2\pi$ of camshaft rotation (for the single-lobe cam). The first intermittent shaft starts the $\sin^2$ speed curve again at $2\pi$ of camshaft rotation. 804 is a speed curve of a second intermittent shaft 116. The second intermittent shaft 116 follows a $\sin^2$ speed curve from $\pi/2$ to $3\pi/2$ of camshaft rotation (because it is $\pi/2$ offset from the first intermittent shaft 116 due to the respective cams 110 being $\pi/2$ offset for the single-lobe cam 300) and is at rest from $3\pi/2$ to $5\pi/2$ of camshaft rotation. 806 is a speed curve of a third intermittent shaft 116. The third intermittent shaft 116 follows a $\sin^2$ speed curve from $\pi$ to $2\pi$ of camshaft rotation (because it is $\pi$ offset from the first intermittent shaft 116 due to the respective cams 110 being $\pi$ offset for the single-lobe cam 300) and is at rest from $2\pi$ to $3\pi$ of camshaft rotation. 808 is a speed curve of a fourth intermittent shaft 116. The fourth intermittent shaft 116 follows a $\sin^2$ speed curve from $3\pi/2$ to $5\pi/2$ of camshaft rotation (because it is $3\pi/2$ offset from the first intermittent shaft 116 due to the respective cams 110 being $3\pi/2$ offset for the single-lobe cam 300) and is at rest from $5\pi/2$ to $7\pi/2$ of camshaft rotation.

It should be noted that the periods may be manipulated via conventional gears. Adding a gear increase or gear reduction between the cams 110 and the intermittent shafts 116 (and/or similarly, adding or decreasing amplitude to the cam 110) may stretch or compress the periods of the intermittent shafts 116 relative to the input shaft.

The speed curves 802, 804, 806, and 808 of the intermittent shafts 116 form $\sin^2$ and $\cos^2$ curves that sum to one. Thus, the speed of the output shaft 704 is uniform in rotation (e.g., no speed changes) with a certain speed ratio relative to the input shaft 202. The variability of the speed ratio is achieved via the translation of the cams 110 such that the cam followers 502 sample variable locations along the tapers of the cams 110 causing the racks 112 to oscillate with variable amplitudes.

Example Method

Figure 9:
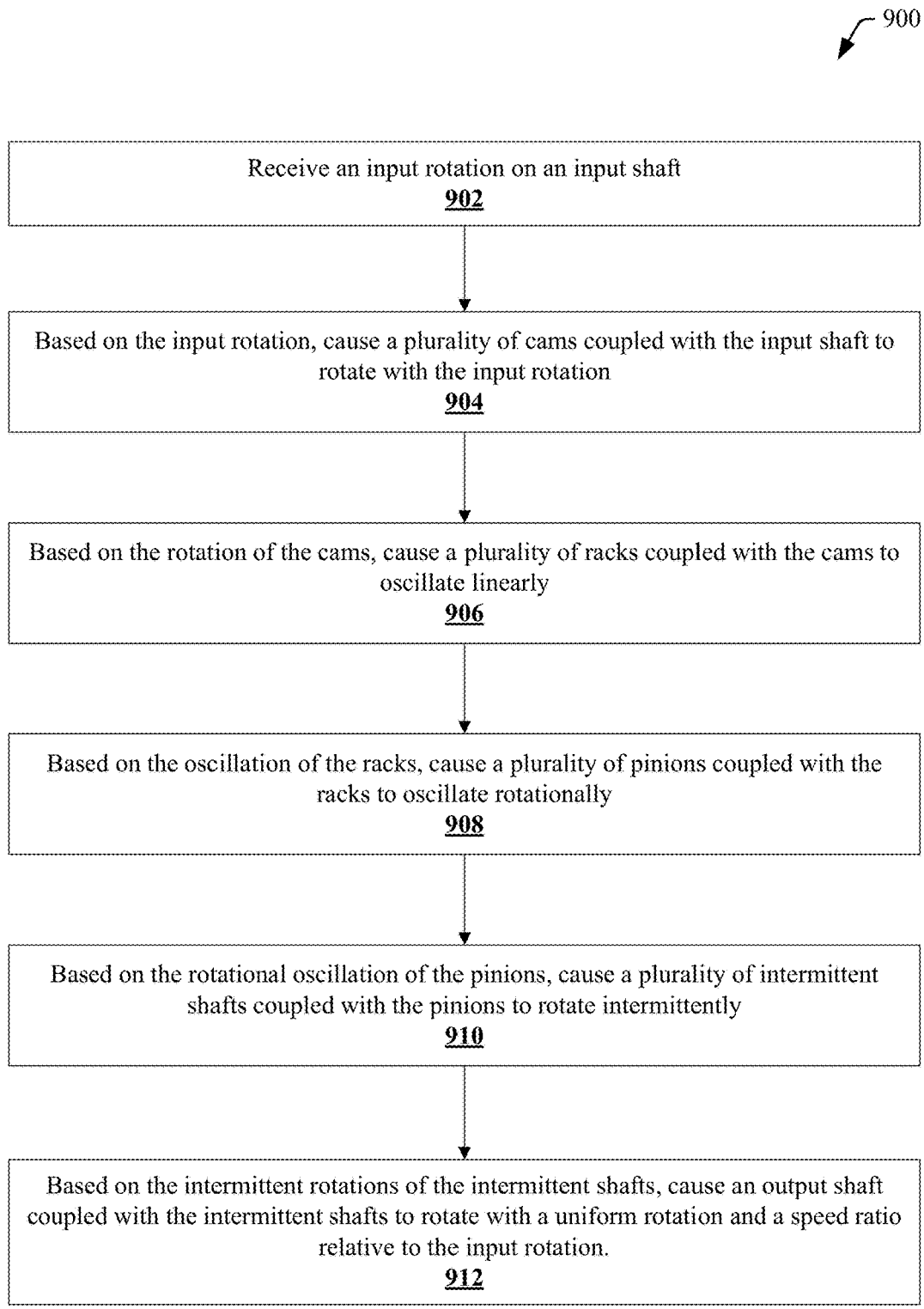
FIG. 9 illustrates, in accordance with this disclosure, an example method of transmitting power through the CVT with oscillating racks.

FIG. 9 is an example method 900 performed by a CVT with oscillating racks. The example method 900 may be implemented in any of the previously described environments, by any of the previously described systems or components, and by utilizing any of the previously described data flows, process flows, or techniques. For example, the example method 900 can be implemented by the CVT with oscillating racks 106. The example method 600 may also be implemented in other environments, by other systems or components, and utilizing other data flows, process flows, or techniques. The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At step 902, an input rotation is received on an input shaft. For example, the CVT with oscillating racks 106 may receive an input rotation of the input shaft 202.

At step 904, based on the input rotation, a plurality of cams that are coupled with the input shaft are caused to rotate with the input rotation. For example, the cams 110 may rotate based on the rotation of the input shaft 202. The cams 110 may be on individual camshafts or combined onto one or more camshafts. Furthermore, the cams 110 may be disposed on the input shaft 202.

At step 906, based on the rotation of the cams, a plurality of racks that are coupled with the cams are caused to oscillate linearly. For example, the racks 112 may be coupled with the cams 110 via ends of the racks 112. The rotation of the cams 110 may cause the racks 112 to oscillate linearly along directions of the racks 112 (e.g., in directions of the gear teeth).

At step 908, based on the oscillation of the racks, a plurality of pinions that are coupled with the racks are caused to oscillate rotationally. For example, the pinions 114 may be coupled with the racks 112 such that the linear oscillation of the racks 112 causes the pinions 114 to oscillate rotationally.

At step 910, based on the rotational oscillation of the pinions, a plurality of intermittent shafts that are coupled with the pinions are caused to rotate intermittently. For example, the intermittent shafts 116 may be coupled with the pinions 114 via the pinion one-way clutches 204 such that the pinions 114 only rotate when the racks 112 are moving in a certain direction (e.g., being pushed by the cams 110).

At step 912, based on the intermittent rotations of the intermittent shafts, an output shaft that is coupled with the intermittent shafts is caused to rotate with a uniform rotation and a speed ratio relative to the input rotation. For example, the planetaries 118 may combine the rotations of the intermittent shafts 116 to produce a rotation of the output shaft 704.

EXAMPLES

Example 1: A continuously-variable transmission (CVT) comprising: an input shaft; a plurality of cams coupled with the input shaft, the cams configured to rotate with a rotation of the input shaft; a plurality of racks coupled to respective cams, the racks configured to oscillate with the rotation of the cams; a plurality of pinions coupled to respective racks; a plurality of intermittent shafts coupled with respective pinions; and an output shaft coupled with the intermittent shafts, the output shaft configured to rotate with a uniform rotation that has a variable speed relative to the input shaft.

Example 2: The CVT of example 1 or 2, further comprising: a plurality of pinion one-way clutches between the pinions and the intermittent shafts; and a plurality of intermittent shaft one-way clutches between the intermittent shafts and a housing of the CVT.

Example 3: The CVT of any preceding example, wherein the cams are single-lobe cams configured to lift the racks for 180 degrees of rotation of the cams.

Example 4: The CVT of any preceding example, wherein the cams are on respective cam shafts that are coupled with the input shaft.

Example 5: The CVT of any preceding example, further comprising: a first planetary comprising: a first gear coupled with a first intermittent shaft of the intermittent shafts; a second gear coupled with a second intermittent shaft of the intermittent shafts; and a second planetary comprising: a first gear coupled with a third intermittent shaft of the intermittent shafts; a second gear coupled with a fourth intermittent shaft of the intermittent shafts.

Example 6: The CVT of example 5, wherein the first and second planetaries are configured to add inputs via the first gears and the second gears to produce outputs via third gears of the first and second planetaries.

Example 7: The CVT of example 6, further comprising a third planetary comprising: a first gear coupled with a third gear of the first planetary; a second gear coupled with a third gear of the second planetary; and a third gear, wherein the output shaft is coupled with the third gear.

Example 8: The CVT of example 7, wherein the third planetary is configured to add inputs via the first gear and the second gear to produce an output via the third gear.

Example 9: The CVT of any preceding example, wherein: first and second cams of the cams are 180 degrees out of phase with each other; and third and fourth cams of the cams are 180 degrees out of phase with each other.

Example 10: The CVT of example 9, wherein: the first and third cams are 90 degrees out of phase with each other; and the second and fourth cams are 90 degrees out of phase with each other.

Example 11: The CVT of any preceding example, wherein the cams have a three-dimensional profile with a varying height along a length of the cams, the varying height configured to cause the racks to oscillate with a varying amplitude.

Example 12: The CVT of example 11, wherein the cams are configured to translate relative to the racks such that different portions of the varying height are coupled with the racks.

Example 13: The CVT of any preceding example, wherein each of the racks is configured to oscillate with a $\sin^2$ or $\cos^2$ speed profile.

Example 14: The CVT of example 13, wherein two of the racks are configured to oscillate with a $\sin^2$ speed profile and another two of the racks are configured to oscillate with a $\cos^2$ speed profile.

Example 15: The CVT of any preceding example, wherein the CVT is configured to be disposed in an automobile.

Example 16: The CVT of example 15, wherein: the input shaft is configured to be coupled with an engine or electric motor; and the output shaft is configured to be coupled with one or more wheels of the automobile.

Example 17: The CVT of any preceding example, wherein the racks are coupled to the cams via ends of the racks.

Example 18: A method comprising: receiving an input rotation on an input shaft; based on the input rotation, causing a plurality of cams coupled with the input shaft to rotate with the input rotation; based on the rotation of the cams, causing a plurality of racks coupled with the cams to oscillate linearly; based on the oscillation of the racks, causing a plurality of pinions coupled with the racks to oscillate rotationally; based on the rotational oscillation of the pinions, causing a plurality of intermittent shafts coupled with the pinions to rotate intermittently; and based on the intermittent rotation of the intermittent shafts, causing an output shaft coupled with the intermittent shafts to rotate with a uniform rotation and a speed ratio relative to the input rotation.

Example 19: The method of example 18, wherein causing the intermittent shafts to rotate intermittently comprises causing each of the intermittent shafts to rotate for a respective portion of the input rotation.

Example 20: The method of example 19, wherein causing the output shaft to rotate with a uniform rotation comprises adding the intermittent rotations of the intermittent shafts to produce the uniform rotation.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A continuously-variable transmission (CVT) comprising:
   an input shaft;
   a plurality of cams coupled with the input shaft, the cams configured to rotate with a rotation of the input shaft;
   a plurality of racks coupled to respective cams, the racks configured to oscillate with the rotation of the cams;
   a plurality of pinions coupled to respective racks;
   a plurality of intermittent shafts coupled with respective pinions;
   a plurality of pinion one-way clutches between the pinions and the intermittent shafts;
   a plurality of intermittent shaft one-way clutches between the intermittent shafts and a housing of the CVT; and
   an output shaft coupled with the intermittent shafts, the output shaft configured to rotate with a uniform rotation that has a variable speed relative to the input shaft.

2. The CVT of claim 1, wherein:
   the plurality of pinion one-way clutches and
   the plurality of intermittent shaft one-way clutches are configured to only allow the intermittent shafts to rotate in one direction.

3. The CVT of claim 1, wherein the cams are single-lobe cams configured to lift the racks for 180 degrees of rotation of the cams.

4. The CVT of claim 1, wherein the cams are on respective cam shafts that are coupled with the input shaft.

5. The CVT of claim 1, further comprising:
   a first planetary comprising:
      a first gear coupled with a first intermittent shaft of the intermittent shafts;
      a second gear coupled with a second intermittent shaft of the intermittent shafts; and
   a second planetary comprising:
      a first gear coupled with a third intermittent shaft of the intermittent shafts;
      a second gear coupled with a fourth intermittent shaft of the intermittent shafts.

6. The CVT of claim 5, wherein the first and second planetaries are configured to add inputs via the first gears and the second gears to produce outputs via third gears of the first and second planetaries.

7. The CVT of claim 6, further comprising a third planetary comprising:
   a first gear coupled with a third gear of the first planetary;
   a second gear coupled with a third gear of the second planetary; and
   a third gear,
   wherein the output shaft is coupled with the third gear.

8. The CVT of claim 7, wherein the third planetary is configured to add inputs via the first gear and the second gear to produce an output via the third gear.

9. The CVT of claim 1, wherein:
   first and second cams of the cams are 180 degrees out of phase with each other; and
   third and fourth cams of the cams are 180 degrees out of phase with each other.

10. The CVT of claim 9, wherein:
    the first and third cams are 90 degrees out of phase with each other; and
    the second and fourth cams are 90 degrees out of phase with each other.

11. The CVT of claim 1, wherein the cams have a three-dimensional profile with a varying height along a length of the cams, the varying height configured to cause the racks to oscillate with a varying amplitude.

12. The CVT of claim 11, wherein the cams are configured to translate relative to the racks such that different portions of the varying height are coupled with the racks.

13. The CVT of claim 1, wherein each of the racks is configured to oscillate with a $\sin^2$ or $\cos^2$ speed profile.

14. The CVT of claim 13, wherein two of the racks are configured to oscillate with a $\sin^2$ speed profile and another two of the racks are configured to oscillate with a $\cos^2$ speed profile.

15. The CVT of claim 1, wherein the CVT is configured to be disposed in an automobile.

16. The CVT of claim 15, wherein:
    the input shaft is configured to be coupled with an engine or electric motor; and
    the output shaft is configured to be coupled with one or more wheels of the automobile.

17. The CVT of claim 1, wherein the racks are coupled to the cams via ends of the racks.

18. A method comprising:
    receiving an input rotation on an input shaft;
    based on the input rotation, causing a plurality of cams coupled with the input shaft to rotate with the input rotation;
    based on the rotation of the cams, causing a plurality of racks coupled with the cams to oscillate linearly;
    based on the oscillation of the racks, causing a plurality of pinions coupled with the racks to oscillate rotationally;
    based on the rotational oscillation of the pinions, causing a plurality of intermittent shafts coupled with the pinions to rotate intermittently via a plurality of pinion one-way clutches between the pinions and the intermittent shafts and a plurality of intermittent shaft one-way clutches between the intermittent shafts and a housing of the CVT; and
    based on the intermittent rotation of the intermittent shafts, causing an output shaft coupled with the intermittent shafts to rotate with a uniform rotation and a speed ratio relative to the input rotation.

19. The method of claim 18, wherein causing the intermittent shafts to rotate intermittently comprises causing each of the intermittent shafts to rotate for a respective portion of the input rotation.

20. The method of claim 19, wherein causing the output shaft to rotate with a uniform rotation comprises adding the intermittent rotations of the intermittent shafts to produce the uniform rotation.

* * * * *